(12) United States Patent
Probasco

(10) Patent No.: US 7,905,428 B1
(45) Date of Patent: Mar. 15, 2011

(54) MULTIPLE CHEMICAL SPRAYER

(75) Inventor: Max A. Probasco, Plano, TX (US)

(73) Assignee: Max A. Probasco, Plano, TX (US)

( * ) Notice: Subject to any disclaimer, the term of this patent is extended or adjusted under 35 U.S.C. 154(b) by 227 days.

(21) Appl. No.: 11/286,879

(22) Filed: Nov. 23, 2005

Related U.S. Application Data

(60) Provisional application No. 60/630,996, filed on Nov. 24, 2004.

(51) Int. Cl.
| | |
|---|---|
| *A62C 31/00* | (2006.01) |
| *B05B 7/10* | (2006.01) |
| *B65D 83/00* | (2006.01) |
| *B67D 7/70* | (2010.01) |
| *F16K 11/078* | (2006.01) |
| *F17D 1/00* | (2006.01) |
| *B65B 1/04* | (2006.01) |

(52) U.S. Cl. ......... 239/305; 239/303; 239/304; 239/310; 239/333; 239/335; 239/373; 239/400; 239/407; 239/428; 239/422; 239/414; 239/416.1; 239/416.3; 222/394; 222/399; 222/401; 222/136; 222/144.5; 222/145.1; 222/145.7; 137/625.4; 137/625.41; 137/266; 141/105

(58) Field of Classification Search .............. 239/303, 239/172, 66, 175, 304, 305, 310, 312, 335, 239/333, 331, 373, 146, 407, 400, 428, 414, 239/416.1, 416.3, 422; 222/394, 399, 401, 222/136, 144.5, 145.1, 145.7; 137/625.4, 137/625.41, 266; 141/105

See application file for complete search history.

(56) References Cited

U.S. PATENT DOCUMENTS

| | | | | |
|---|---|---|---|---|
| 1,979,135 | A * | 10/1934 | Altenburger et al. | 239/414 |
| 2,571,575 | A * | 10/1951 | Holmes | 239/9 |
| 2,746,641 | A * | 5/1956 | King | 222/2 |
| 3,103,312 | A * | 9/1963 | Damrow | 239/135 |
| 3,442,453 | A * | 5/1969 | Whitehouse, Jr. | 239/71 |
| 3,676,170 | A * | 7/1972 | Kempthorne | 427/201 |
| 3,680,786 | A | 8/1972 | Levy | 239/146 |
| 3,782,631 | A * | 1/1974 | Brockly | 239/85 |
| 3,797,744 | A * | 3/1974 | Smith | 239/172 |
| 3,976,087 | A * | 8/1976 | Bolton et al. | 137/15.01 |
| 4,050,629 | A * | 9/1977 | Query et al. | 239/11 |
| 4,059,123 | A * | 11/1977 | Bartos et al. | 134/102.2 |
| 4,173,305 | A * | 11/1979 | Blankenship | 239/79 |
| 4,524,912 | A | 6/1985 | Jones | 239/150 |
| 4,967,960 | A * | 11/1990 | Futrell | 239/148 |
| 5,064,123 | A * | 11/1991 | Aiello et al. | 239/706 |
| 5,074,438 | A | 12/1991 | Ingram | 222/132 |

(Continued)

*Primary Examiner* — Len Tran
*Assistant Examiner* — Steven M Cernoch
(74) *Attorney, Agent, or Firm* — Klemchuk Kubasta LLP; Keith E. Taber

(57) ABSTRACT

A sprayer has a sprayer outlet and a pressurizable reservoir adapted to contain a fluid. The reservoir has an air-pressure outlet and a reservoir outlet, the reservoir outlet being in fluid connection with the sprayer outlet. Detachable, pressurizable tanks are adapted to contain a chemical, each tank having a chemical outlet and an air-pressure inlet. Each air-pressure inlet is in fluid connection with the air-pressure outlet of the reservoir for equalizing air pressure between the reservoir and each tank. A switch is adjustable between a plurality of settings for causing at least one of the chemical outlets to be in fluid connection with the sprayer outlet. A ratio valve is provided for selecting a fluid flow rate out of the selected outlet. Fluids flowing into the sprayer outlet from the outlets are mixed together prior to discharge from the sprayer outlet.

18 Claims, 5 Drawing Sheets

U.S. PATENT DOCUMENTS

| | | | |
|---|---|---|---|
| 5,199,604 A | 4/1993 | Palmer et al. | 222/25 |
| 5,387,200 A | 2/1995 | Kronstadt | 604/290 |
| 5,511,568 A * | 4/1996 | Bowman et al. | 134/102.2 |
| 5,833,765 A * | 11/1998 | Flynn et al. | 134/22.12 |
| 6,427,713 B1 * | 8/2002 | Dempsey et al. | 137/98 |
| 6,532,998 B2 * | 3/2003 | Beldham et al. | 141/18 |
| 6,554,165 B2 | 4/2003 | Cote | 222/129.1 |
| 6,695,224 B2 * | 2/2004 | Hunter | 239/290 |
| 6,766,966 B2 * | 7/2004 | You | 239/146 |
| 6,883,560 B2 * | 4/2005 | Beldham et al. | 141/18 |
| 2002/0008163 A1 * | 1/2002 | Simmons | 239/407 |

* cited by examiner

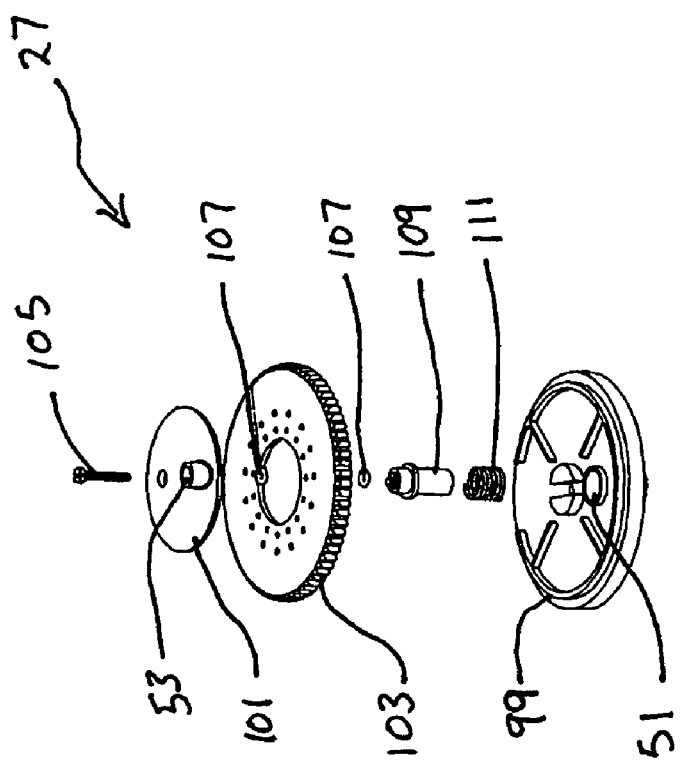
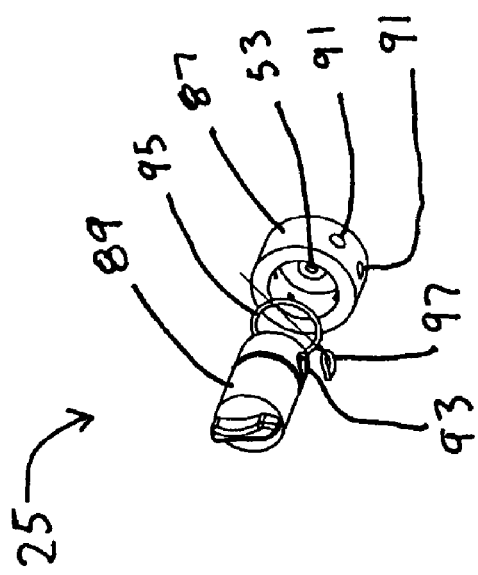

MULTIPLE CHEMICAL SPRAYER

This application claims the benefit of U.S. Provisional Application No. 60/630,996, filed 24, Nov. 2004, titled "Multiple Chemical Sprayer".

BACKGROUND OF THE INVENTION

1. Field of the Invention

The invention relates to sprayers, and more particularly to household and landscaping sprayers that can hold multiple chemicals.

2. Background

Portable sprayers are well known for usage around the home, landscaping, and commercial businesses. Typical usage includes the application of water soluble chemicals as well as chemicals that may me mixed with water for application purposes. Examples include pesticides and herbicides, but may also include other applications such as pigments or curing agents for cement and cleaning chemicals to aid in washing vehicles. The above uses are examples only; many other uses are known and will be discovered for portable sprayers.

A problem with current sprayers is that the chemical to be sprayed is mixed with a volume of water and placed into the sprayer. The ratio of chemical to water is then fixed and the sprayer may only spray that one chemical at that one ratio. If multiple chemicals are needed, then multiple sprayers will have to be prepared. For example, in maintaining a property a broad spectrum herbicide may be desired that will kill all leafy green vegetation along a fence line, at the same time a narrow spectrum herbicide may be needed for killing weeds in a grassy area without harming the grass, while at the same time an insecticide may be desired for application to ant mounds or other insect infestations. The person doing the maintenance may not know how much of each chemical would be needed, but suspects that all three may be needed. Therefore, the person prepares three full tanks; one of each chemical. As the day progresses it may be that one herbicide was needed frequently while the other chemicals were not, therefore, the person must refill one sprayer, and store the other two after not using them completely.

A further problem with current sprayers is that many chemicals are corrosive and can damage the sprayer if stored in the sprayer for long periods. This requires either that the sprayer be made of expensive, corrosion-resistant materials or that any unused chemical mixture be disposed of instead of stored. This is a waste of chemical mixture and can cause waste-disposal problems, depending on the nature of the chemical.

Another problem with existing sprayers is that certain applications may require varying ratios of chemical to water based on the usage. For example, a high ratio of fungicide may be used on a plant with obvious signs of fungal infestation, while a lower ratio may be used on a plant that needs only preventive treatment. This requires two different sprayers for the same chemical.

One result of the use of multiple sprayers is that the person doing the spraying must have a vehicle to carry so many sprayers. Even if each sprayer alone is handheld, three sprayers together require a vehicle to transport efficiently. This can increase maintenance costs significantly.

In response to the above problems there have been some attempts that include multiple tanks attached to a larger carrier. This eases some of the physical limitations of the simple sprayer, but does not address the problems that arise from having to prepare the chemical before usage.

SUMMARY OF THE INVENTION

Therefore, there is a need for a sprayer with the ability to spray multiple chemicals combined with water from a single water reservoir. It would be a further advantage if the sprayer allowed for varying chemical-to-water ratios for each chemical and for different applications of a single chemical. A further advantage would be if only the chemical being used is mixed with water so that any unused chemical may be stored in a more compact solution.

It is an object of this invention to provide a sprayer that allows for the mixing of multiple chemicals with water for different applications. It is a further object of this invention to provide a sprayer that allows for changing between at least two different chemicals and for setting the ratio of chemical to water based on the application.

These and other objects are achieved by providing a sprayer having a sprayer outlet and a pressurizable reservoir adapted to contain a fluid. The reservoir has an air-pressure outlet and a reservoir outlet, the reservoir outlet being in fluid connection with the sprayer outlet. Detachable, pressurizable tanks are adapted to contain a chemical, each tank having a chemical outlet and an air-pressure inlet. Each air-pressure inlet is in fluid connection with the air-pressure outlet of the reservoir for equalizing air pressure between the reservoir and each tank. A switch is adjustable between a plurality of settings for causing at least one of the chemical outlets to be in fluid connection with the sprayer outlet. A ratio valve is provided for selecting a fluid flow rate out of the selected outlet. Fluids flowing into the sprayer outlet from the outlets are mixed together prior to discharge from the sprayer outlet.

The present invention provides several significant advantages, including: (1) providing the selection of more than one chemical from a single sprayer; (2) providing varying application ratios for each chemical; (3) providing varying application ratios for a single chemical based on application; (4) reducing the waste of chemicals caused by preparing more than what is needed due to uncertainty; and (5) reducing the need for multiple sprayers and thereby reducing the work involved in spraying multiple chemicals.

Additional objectives, features, and advantages will be apparent from the written description that follows.

BRIEF DESCRIPTION OF THE DRAWINGS

The novel features believed characteristic of the invention are set forth in the appended claims. However, the invention itself, as well as, a preferred mode of use, and further objectives and advantages thereof, will best be understood by reference to the following detailed description when read in conjunction with the accompanying drawings, wherein:

FIG. 7 is an exploded view of the selector valve used in the sprayer of FIG. 1; and FIG. 8 is an exploded view of the ratio valve used in the sprayer of FIG. 1.

DETAILED DESCRIPTION OF THE PREFERRED EMBODIMENT

The present invention represents the discovery that multiple chemicals may be applied with a single sprayer supplied with a selector valve and ratio valve to control the application. A sprayer of the invention is particularly useful where multiple chemicals may be needed in varying amounts and ratios.

Figure 1:
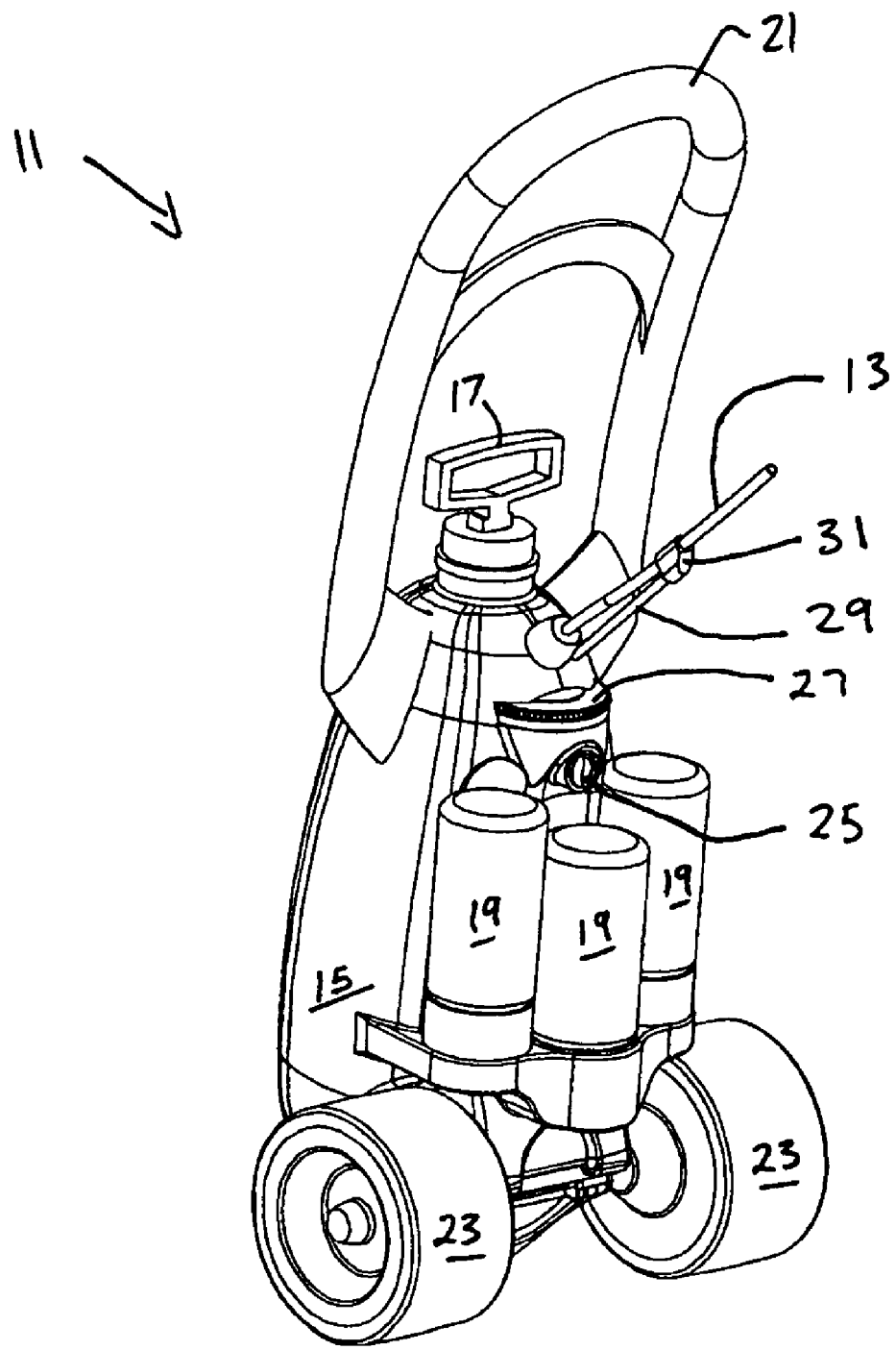
FIG. 1 is a perspective view of a multi-chemical sprayer of the invention.

Referring to FIG. 1 in the drawings, a sprayer 11 is shown with a nozzle hose 13 extending from a tank 15. A pressure source 17 is positioned at the top of tank 15, and when pressure source 17 is removed, tank 15 is easily filled with fluid. Pressure source 17, as shown in FIG. 1, is a conventional hand pump of the type used on many other portable sprayers. Other pressure sources 17 may be used to provide a pressure in tank 15; such as compressed gas, electric pumps, or other mechanical pressure pumps. Containers 19 are positioned near tank 15. As is discussed in more detail below, each container 19 contains chemicals to be mixed with the fluid in tank 15 and applied as a mixture by sprayer 11.

Near the top of tank 15 a handle 21 is provided to increase the mobility of sprayer 11. Additionally, wheels 23 are attached near the bottom of tank 15 to allow for increased mobility of the sprayer.

Continuing with FIG. 1, a selector valve 25 is positioned above containers 19. Selector valve 25 allows an operator to select the chemical carried in one of containers 19 to be mixed with the fluid in tank 15. Above selector valve 25 is ratio valve 27. Ratio valve 27 controls the amount of the chemical from selected container 19 that will be mixed with the fluid from tank 15. Changing the setting of ratio valve 27 changes the ratio of chemical to fluid. The chemical exiting ratio valve 27 is fed through a feed line 29, shown below nozzle hose 13, to a mixing point 31, shown along nozzle hose 13. Nozzle hose 13 extends from tank outlet 33 (FIGS. 2 and 3) beyond mixing point 31. The fluid exits tank 15 through tank outlet 33 and enters nozzle hose 13. The fluid then passes mixing point 31, where a measured amount of the chemical from selected container 19 is mixed with the fluid.

Figure 2:
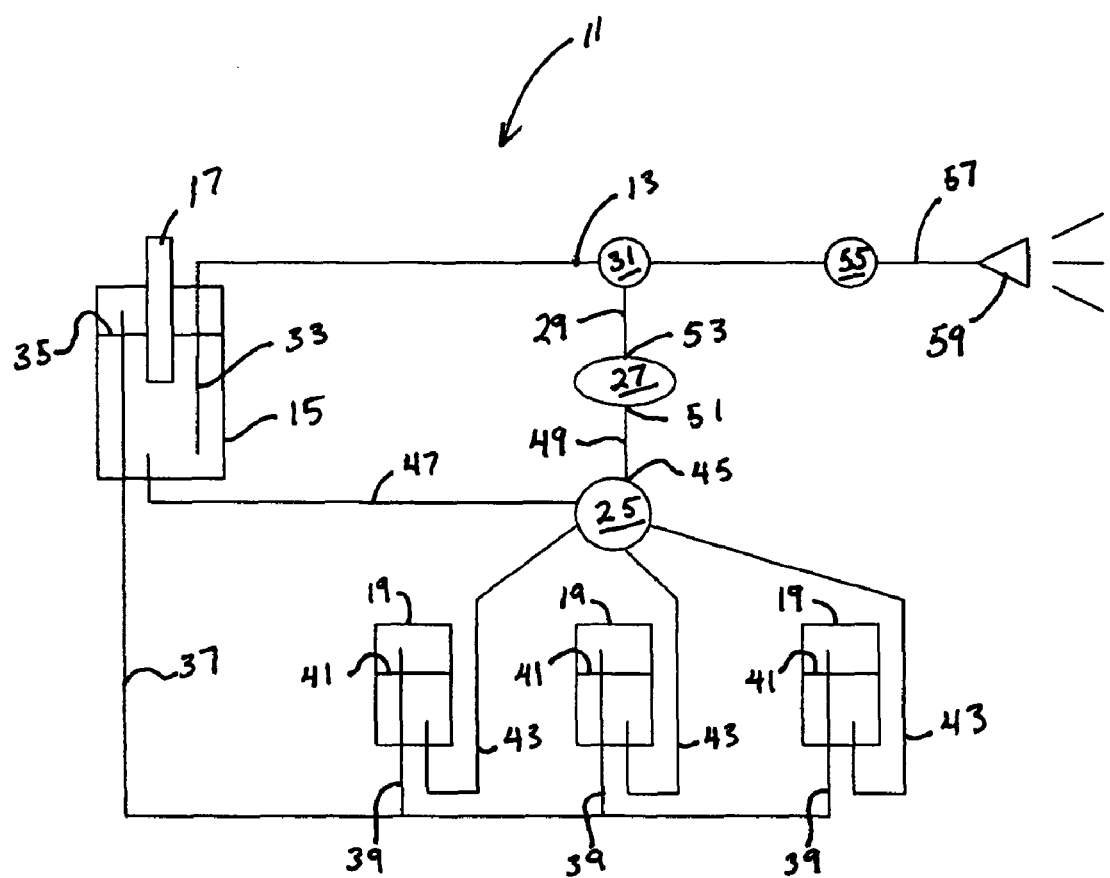
FIG. 2 is a schematic flow diagram of a multi-chemical sprayer of the invention.

Referring now to FIG. 2, a schematic of the flow paths of sprayer 11 allows for a more detailed discussion of the parts and operation of sprayer 11. Tank 15 will contain fluid and air. The fluid will typically be water, but could be any fluid that needs to be mixed with a chemical in application. A fluid level 35 shows the maximum level of fluid that should be allowed in tank 15. Pressure source 17 creates an increase in air pressure in the tank above the fluid. Tank pressure line 37 is in fluid communication with the air above the fluid line to communicate the pressure in the air to container pressure lines 39. Container pressure lines 39 communicate the pressure from tank pressure line 37 into containers 19. Containers 19 have chemical levels 41 and container pressure lines are preferably in communication with the air above chemical levels 41. The communication provided by tank pressure line 37 and container pressure lines 39 allows for the use of a single pressure source 17 to pressurize tank 15 as well as containers 19, and to ensure that the pressure in containers 19 is the same as the pressure in tank 15.

Containers 19 have chemical lines 43 that communicate with selector valve 25. Selector valve 25 selects one of chemical lines 43 to communicate with selector outlet 45. Additionally, a purge line 47 may be connected to selector valve 25. Purge line 47 runs from near the bottom of tank 15 to selector valve 25 to provide fluid to selector valve 25. Supply line 49 connects selector outlet 45 to ratio inlet 51 of ratio valve 27. Ratio valve 27 has a ratio outlet 53 connected to feed line 29, discussed above.

In use a chemical is pushed out of container 19 by pressure provided by pressure source 17 and communicated to container 19 through tank pressure line 37 and container pressure line 39. The chemical exits container 19 through chemical line 43, leading to selector valve 25. If selector valve 25 is positioned to select the chemical from this container, the chemical is passed through selector valve 25 and out selector outlet 45 to supply line 49, leading to ratio inlet 51. Upon entering ratio valve 27 through ratio inlet 51 a measured amount of the chemical is allowed to pass to feed line 29 and on to mixing point 31, where the measured amount of chemical is mixed with fluid flowing through nozzle hose 13 to nozzle valve 55. Nozzle valve 55 may be found in the handle of nozzle spray wand 57. Nozzle valve controls the flow of fluid mixed with chemical nozzle stem 57 and out nozzle 59.

After a first chemical has been applied, but prior to selecting a second chemical, it may be advantageous to clean residue of the first chemical from selector valve 25, supply line 49, ratio valve 27, feed line 29, mixing point 31, nozzle hose 13, nozzle valve 55, nozzle wand 57, and nozzle 59. To do so selector valve 25 may be positioned to select purge line 47. By selecting purge line 47 fluid will be fed into selector valve 25 and flow through supply line 49, ratio valve 27, feed line 29, mixing point 31, nozzle hose 13, nozzle valve 55, nozzle wand 57 and nozzle 59. The effectiveness of using the purge line 47 will depend on the relationship between the first chemical and the fluid in tank 15, but where the fluid is water and the chemical is water soluble a thorough cleaning may be achieved by selecting purge line 47 and allowing a few seconds of flow at this setting.

Figure 3:
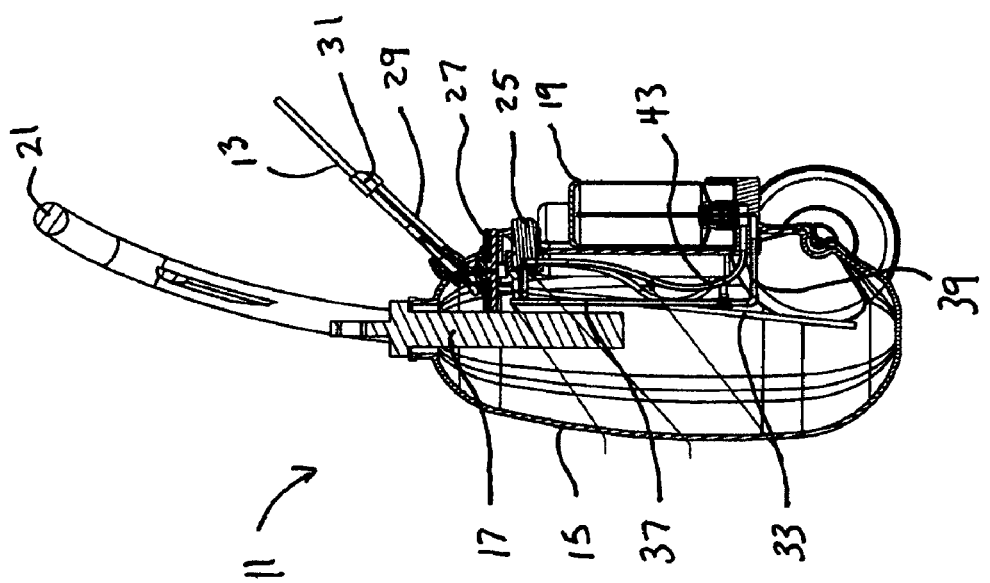
FIG. 3 is a sectional view of the sprayer of FIG. 1.

Referring now to FIG. 3 of the drawings, a cross-section of the sprayer 11 of FIG. 1 allows for a further discussion of this embodiment. The arrangement of tank 15, pressure source 17 and containers 19 is shown. Tank outlet 33 is shown extending form near the bottom of tank 15 to the connection with nozzle hose 13. Tank pressure line 37 is shown connected to container pressure line 39. Chemical line 43 is shown leading to selector valve 25. The connection between container 19 and sprayer 11 is shown in more detail in FIG. 4. Selector valve 25 is shown below ratio valve 27. As is clear in FIG. 3, fluid, chemical and pressure lines may be constructed of suitable tubing materials, such as rubber, plastic, or polyvinylchloride tubing. Alternatively, the lines may be molded into the body of sprayer 11 or into the sidewalls of tank 15. Such molding is somewhat expensive at this time but is expected to be more economical in the future.

Figure 4:
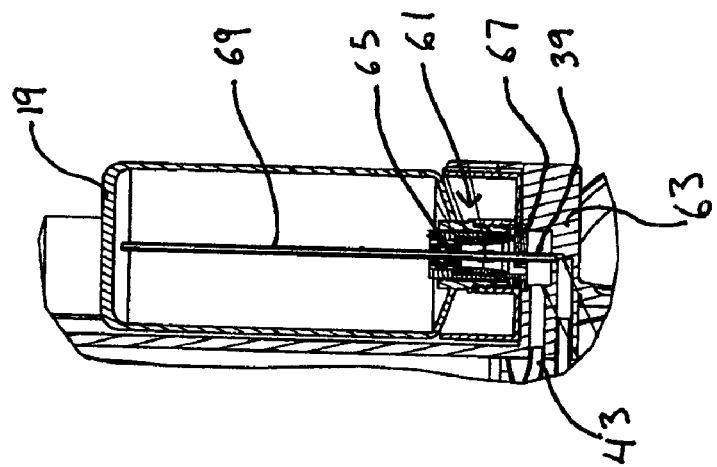
FIG. 4 is a sectional view of a one-way valve assembly used in the sprayer of FIG. 1.

Referring now to FIG. 4 of the drawings, a cross section of the connection between container 19 and sprayer 11 is shown. In particular, container 19 requires a connection that allows pressure to enter and chemicals to exit container 19. To achieve that goal a coaxial one-way valve 61 has been used in this embodiment. Containers 19 attach to fittings 63 on sprayer 11. Containers 19 have female one-way valves 65 and fittings 63 have male one-way valves 67 that mate to form a coaxial one-way valve 61. Coaxial one-way valve 61 allows the chemical to flow out of container 19 into chemical line 43 without allowing any chemical to flow from chemical line 43 into container 19. At the same time, coaxial one-way valve 61 connects container pressure line 39 to a pressure tube 69 within container 19, allowing free flow of pressure between container 19 and tank 15, and vice versa.

Figure 5:
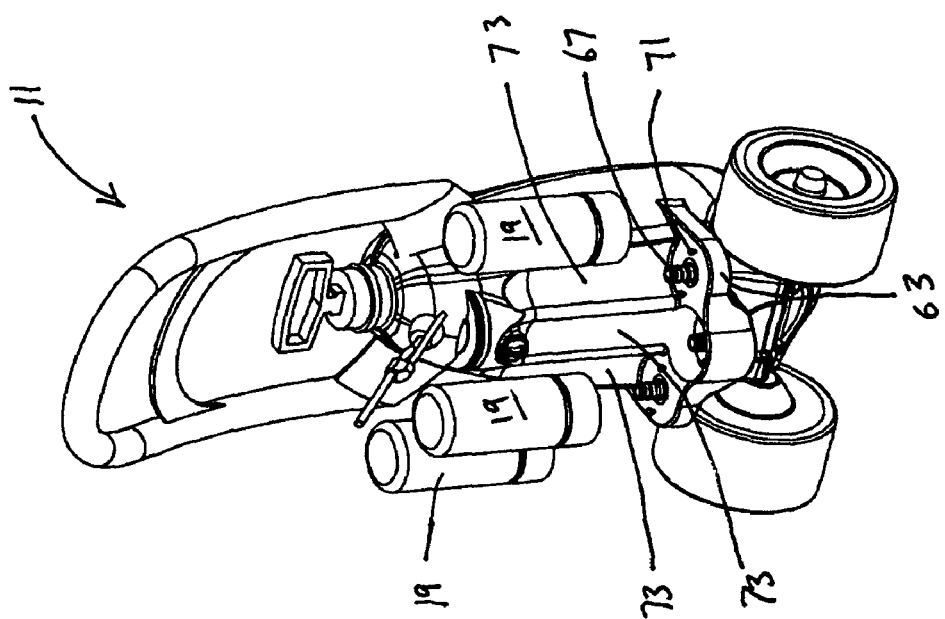
FIG. 5 is a view of the sprayer of FIG. 1 with containers removed.

Referring now to FIG. 5 of the drawings, sprayer 11 of FIG. 1 is shown with containers 19 removed, thereby exposing fittings 63. Fittings 63 support male one-way valves 67 and keys 71. Keys 71 secure containers 19 to fittings 63. Also shown in this view are recesses 73 in tank 15 to allow sprayer 11 to be compact.

Figure 6:
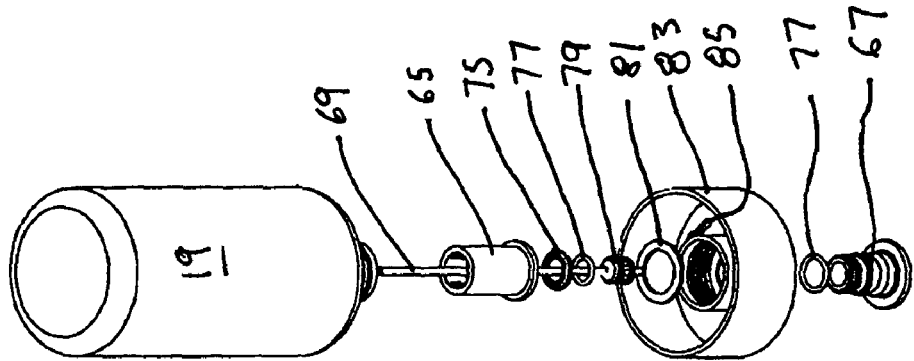
FIG. 6 is an exploded view of the one-way valve assembly shown in FIG. 4.

Referring now to FIG. 6 of the drawings, an exploded view of container 19 allows for a more detailed look at the parts of one-way valve 61. Container 19 is shown above pressure tube 69 extending through female one-way valve 65, including valve sleeve 75, O-ring 77, valve core 79, and flexible washer 81, which seals container 19 to cap 83. Cap 83 has key holes 85 which mate with keys 71 to secure containers 19 to fittings 63. Male one-way valve 67 is shown with an additional O-ring 77.

Referring now to FIG. 7, selector valve 25 of the embodiment shown in FIG. 1 is shown in exploded view. Selector valve 25 has a valve body 87 and a selector knob 89 which rotates within valve body 87. Valve body 87 has several inlets 91 spaced about a circumference for attachment to chemical lines 43, and optional purge line 47, and a selector outlet 45 positioned at the rear of valve body 87. Selector knob 89 has a single passage 93 that extends from a circumference to the rear, thus allowing for communication between one inlet 91 and selector outlet 45 at a time as selector knob 89 is rotated. To reduce leakage out of the selector valve 25 a body O-ring 95 is about the circumference of knob 89, between knob 89 and body 87. To prevent leakage within the selector valve a passage O-ring 97 seals passage 93 to body 87 and allows flow from only one inlet 91 at a time.

Referring now to FIG. 8 of the drawings, ratio valve 27 of the embodiment shown in FIG. 1 is shown in exploded view. Ratio valve 27 is made up of an inlet fixture 99, an outlet fixture 101, and an orifice flange 103 between the fixtures 99, 101. As chemical or fluid enters through ratio inlet 51 of inlet fixture 99 the chemical or fluid must pass through orifice flange 103. Depending on the position of orifice flange 103 the chemical or fluid will pass through different size holes in orifice flange 103, thereby determining a measured flow rate out of ratio outlet 53 in outlet fixture 101. Fixtures 99, 101 are secured about orifice flange with a central retaining member 105. O-rings 107, compression member 109, and spring 111 provide smooth and accurate operation of ratio valve 27.

While shown as having three containers 19, sprayer 11 may be configured to have only one container 19, in which case the user will remove a first container 19 and install a second container 19 to change the chemical being used in sprayer 11. In this configuration, selector valve 25 is not used to switch between multiple chemical lines 43, but valve 25 will still be used to select between a single chemical line 43 and purge line 47.

The present invention provides several significant advantages, including: (1) providing the selection of more than one chemical from a single sprayer; (2) providing varying application ratios for each chemical; (3) providing varying application ratios for a single chemical based on application; (4) reducing the waste of chemicals caused by preparing more than what is needed due to uncertainty; and (5) reducing the need for multiple sprayers and thereby reducing the work involved in spraying multiple chemicals.

It is apparent that an invention with significant advantages has been described and illustrated. Although the present invention is shown in a limited number of forms, it is not limited to just these forms, but is amenable to various changes and modifications without departing from the spirit thereof.

I claim:

1. A sprayer, comprising: a sprayer outlet; a pressurizable reservoir containing a carrier liquid and air, the reservoir having an air-pressure outlet in communication with the air in the reservoir and a reservoir outlet in communication with the carrier liquid in the reservoir, the reservoir outlet being in fluid connection with the sprayer outlet; at least one pressurizable tank, each tank being detachable and containing a liquid chemical and air, each tank having a chemical outlet in communication with the liquid chemical in the tank and an air-pressure inlet in communication with the air in the tank, each air-pressure inlet being in direct connection with the air-pressure outlet of the reservoir such that air pressure in each tank is equal to air pressure in the; a selector valve adjustable between a plurality of settings for causing at least one selected chemical outlet to be in fluid connection with the sprayer outlet; and a ratio valve between the selector valve and the sprayer outlet for selecting a fluid flow rate out of the at least one selected chemical outlet; wherein carrier liquid flowing into the sprayer outlet from the reservoir outlet and liquid chemical flowing into the sprayer outlet from the at least one selected tank outlet are at equal pressures and are mixed together prior to discharge from the sprayer outlet; wherein the selector valve is in fluid connection with the chemical outlet of each tank through multiple inlets, and the selector valve has a single selector outlet in fluid connection with the sprayer outlet.

2. The sprayer according to claim 1, further comprising: an air pump for pressurizing the reservoir.

3. The sprayer according to claim 2, wherein the air pump for pressurizing the reservoir is a hand powered air pump.

4. The sprayer according to claim 1, wherein the ratio valve is in fluid connection with the chemical outlet of each tank, and the ratio valve has a valve outlet in fluid connection with the sprayer outlet.

5. The sprayer according to claim 1, wherein the selector valve is in fluid connection with the chemical outlet of each tank, the selector valve having a selector outlet; and the ratio valve is in fluid connection with the selector outlet, the ratio valve having a valve outlet in fluid connection with the sprayer outlet.

6. The according to claim 1, further comprising:
a frame carrying the reservoir, tanks, selector valve, and ratio valve; and wheels rotatably connected to the frame.

7. The sprayer according to claim 1, further comprising:
a purge line fluidly connecting the reservoir to the selector valve for cleaning the sprayer.

8. The sprayer according to claim 1, wherein the sprayer outlet is a handheld wand assembly.

9. The sprayer according to claim 1, further comprising:
a one-way valve for connecting the tanks to the sprayer such that any pressure in the reservoir may be communicated to the tanks and any fluid in the tanks may be in fluid connection with the selector valve.

10. A sprayer, comprising:
a tank having an air pressure source, a sealable water inlet, an internal pressure, and a tank outlet through which water is released from the tank under pressure;
a plurality of chemical containers, each container having a fluid outlet and an internal pressure determined by and equal to the internal pressure of the tank;
a selector valve with a plurality of inlets, each inlet in fluid connection with a corresponding fluid outlet from each chemical container, the selector valve operable to select one fluid outlet to be in fluid connection with a selector outlet of the selector valve;
a ratio valve in fluid connection with the outlet of the selector valve, the ratio valve operable to adjust a flow rate through the ratio valve to an outlet of the ratio valve; and
a mixing point in fluid connection with the outlet of the ratio valve and the tank outlet, allowing any fluid that may flow through the ratio valve to be mixed with fluid released from the tank outlet, the fluid from the ratio valve and the fluid from the tank outlet being at equal pressures.

11. The sprayer according to claim 10, wherein the plurality of chemical containers comprises three chemical containers.

12. The sprayer according to claim 10, further comprising:
a purge line for allowing fluid connection between the tank and the selector valve such that the selector valve is operable to select fluid directly from the tank in order to purge the selector valve, ratio valve, mixing point, and the fluid connections there between.

13. The sprayer according to claim 10, further comprising:
a handheld wand assembly attached in fluid connection to the mixing point to allow application of a mixture of a fluid content of one of the containers and a fluid content of the tank in a ratio determined by the ratio valve.

14. The sprayer according to claim 10, further comprising:
a one-way valve for connecting the containers to the sprayer such that any pressure in the tank may be communicated to the containers and any fluid in the containers may be in fluid connection with the selector valve.

15. The sprayer according to claim 10, further comprising:
wheels connected to the tank to aid in the portability of the sprayer.

16. The sprayer according to claim 10, further comprising:
a handle and wheels connected to the tank to aid in the portability of the sprayer.

17. The sprayer according to claim 10, wherein the pressure generator is a manually powered pressure pump.

18. The sprayer according to claim 10, wherein pressure is communicated between the tank and the containers by fluid connection between a point within the tank above a fluid level in the tank to a point within the containers and above a fluid level in the containers.

* * * * *